(12) United States Patent
Bojanowski

(10) Patent No.: US 9,340,096 B2
(45) Date of Patent: May 17, 2016

(54) VEHICLE AND A METHOD OF ATTACHING A SUNROOF ASSEMBLY TO THE VEHICLE

(71) Applicant: GM GLOBAL TECHNOLOGY OPERATIONS LLC, Detroit, MI (US)

(72) Inventor: Gerald M. Bojanowski, Washington Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/323,062

(22) Filed: Jul. 3, 2014

(65) Prior Publication Data

US 2015/0123430 A1     May 7, 2015

Related U.S. Application Data

(60) Provisional application No. 61/898,662, filed on Nov. 1, 2013.

(51) Int. Cl.
| | |
|---|---|
| *B60J 7/043* | (2006.01) |
| *B60J 7/00* | (2006.01) |
| *B60J 10/12* | (2006.01) |
| *B60J 7/02* | (2006.01) |

(52) U.S. Cl.
CPC .............. *B60J 7/0084* (2013.01); *B60J 7/022* (2013.01); *B60J 7/043* (2013.01); *B60J 10/12* (2013.01); *Y10T 29/49817* (2015.01); *Y10T 29/49826* (2015.01)

(58) Field of Classification Search
CPC ...................................................... B60J 7/043
USPC ................ 296/216.01–224; 29/428
See application file for complete search history.

(56) References Cited

U.S. PATENT DOCUMENTS

| | | | | |
|---|---|---|---|---|
| 4,159,144 | A * | 6/1979 | Ehlen et al. | 296/222 |
| 4,293,161 | A * | 10/1981 | Lutz | 296/213 |
| 4,332,416 | A * | 6/1982 | Lutz | B60J 7/057 |
| | | | | 296/213 |
| 4,416,487 | A * | 11/1983 | Hirotani et al. | 296/222 |
| 4,659,139 | A * | 4/1987 | Hisaminato et al. | 296/210 |
| 4,671,565 | A * | 6/1987 | Grimm et al. | 296/216.04 |
| 4,811,985 | A * | 3/1989 | Kruger et al. | 296/214 |
| 4,923,245 | A * | 5/1990 | Kuwabara | 296/214 |
| 5,048,890 | A * | 9/1991 | Masuda | 296/216.08 |
| 5,100,197 | A * | 3/1992 | Ichinose et al. | 296/216.04 |
| 5,154,482 | A * | 10/1992 | Hayashi et al. | 296/223 |
| 6,340,204 | B1 * | 1/2002 | Seifert | 296/216.07 |
| 6,409,258 | B1 * | 6/2002 | Grimm et al. | 296/216.08 |
| 7,393,047 | B2 * | 7/2008 | Hirotani et al. | 296/214 |
| 7,731,275 | B2 * | 6/2010 | Bergmiller et al. | 296/216.08 |

* cited by examiner

*Primary Examiner* — Dennis H Pedder
(74) *Attorney, Agent, or Firm* — Quinn Law Group, PLLC

(57) ABSTRACT

A vehicle and a method of attaching a sunroof assembly to the vehicle are disclosed. A structural frame is provided having a roof portion. The structural frame defines a passenger compartment adjacent to the roof portion. The structural frame includes a flange extending along at least a segment of the roof portion. The flange includes a first side facing inwardly toward the passenger compartment and a second side facing outwardly away from the passenger compartment. A sunroof frame is attached to the first side of the flange from inside the passenger compartment. Furthermore, a glass apparatus is operatively connected to the sunroof frame from the second side of the flange outside of the passenger compartment. Attaching the sunroof frame to the first side of the flange occurs before operatively connecting the glass apparatus to the sunroof frame. The sunroof frame and the glass apparatus define the sunroof assembly.

20 Claims, 3 Drawing Sheets

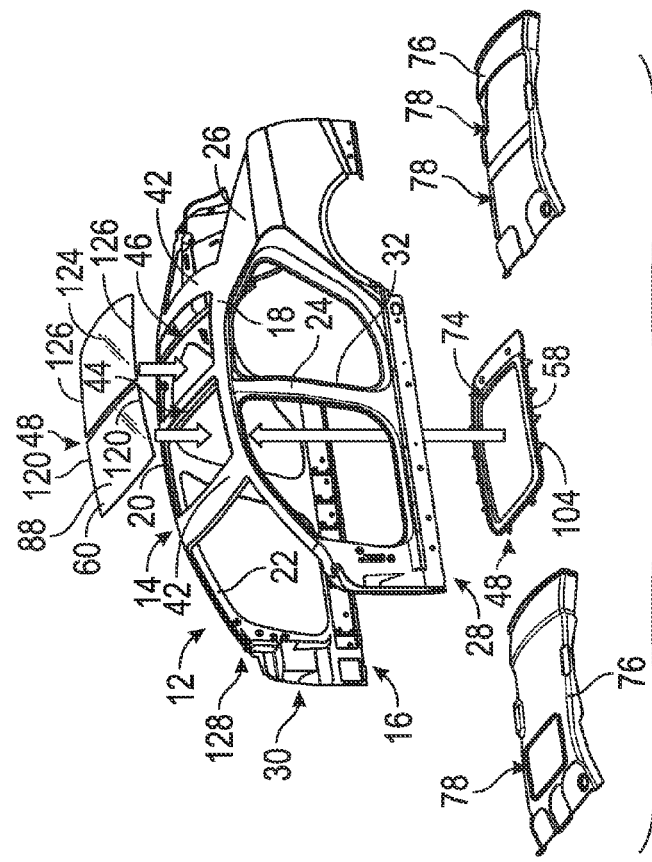
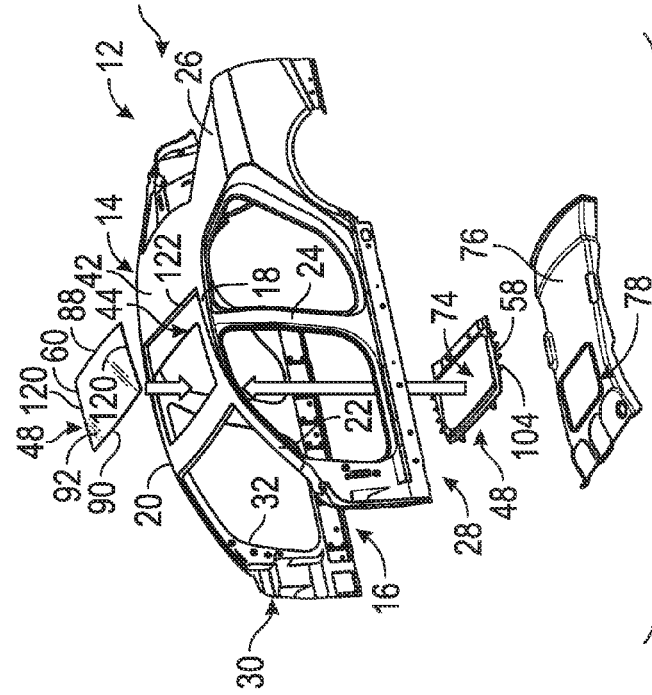
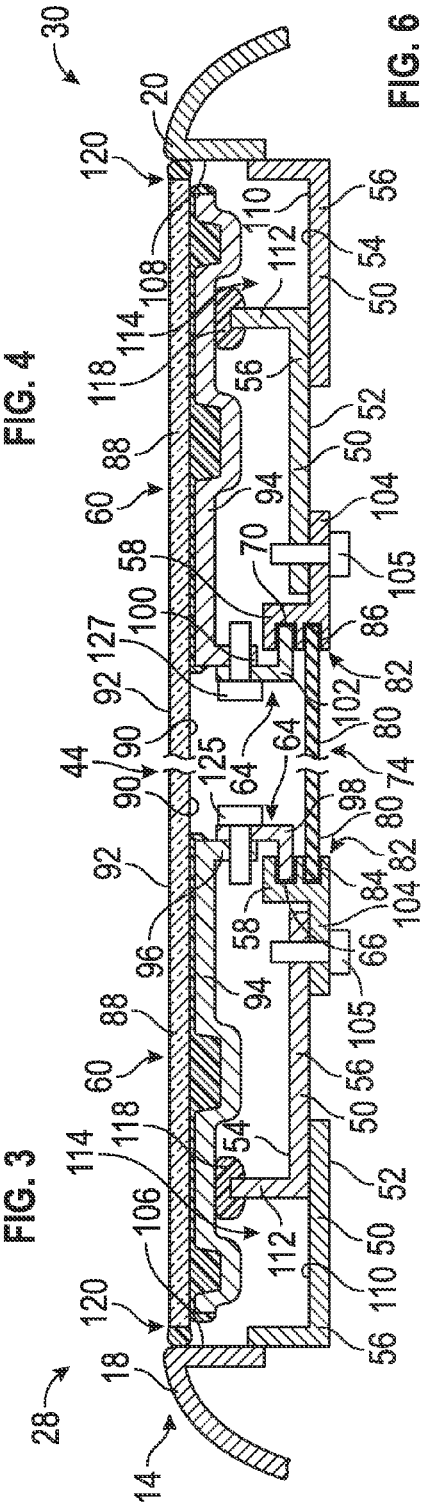

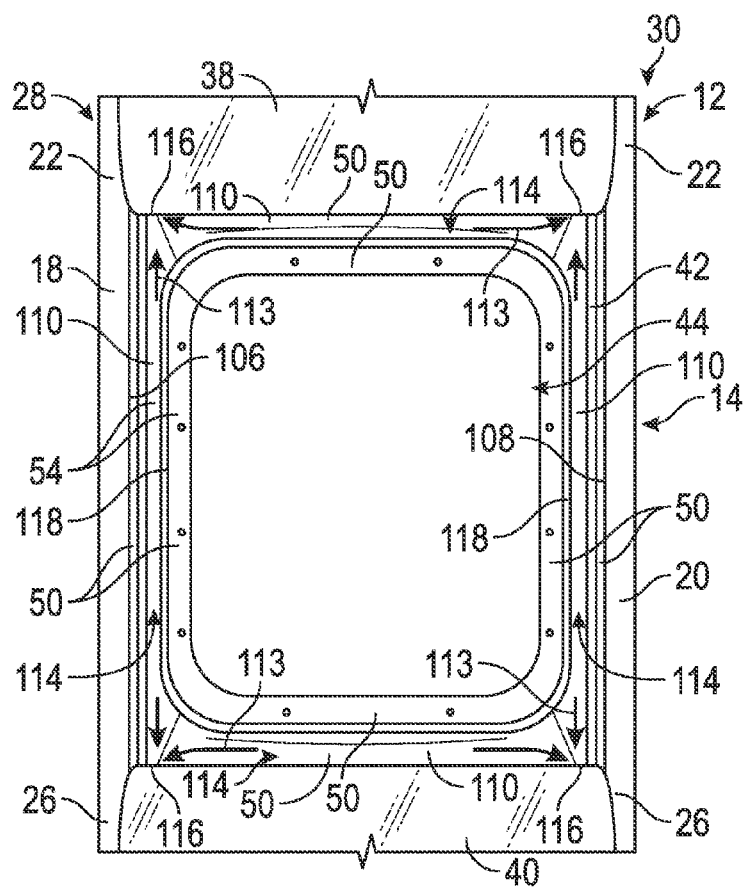
FIG. 5
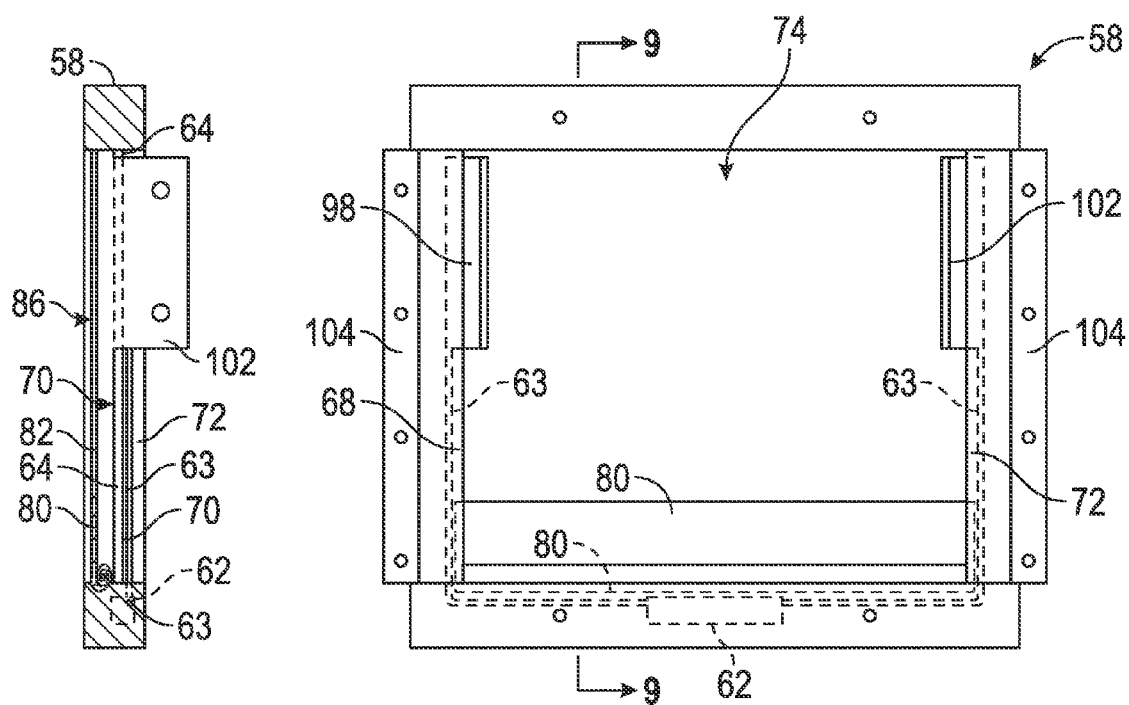
FIG. 9
FIG. 7

VEHICLE AND A METHOD OF ATTACHING A SUNROOF ASSEMBLY TO THE VEHICLE

CROSS-REFERENCE TO RELATED APPLICATIONS

This application claims the benefit of U.S. Provisional Application No. 61/898,662, filed on Nov. 1, 2013, which is hereby incorporated by reference in its entirety.

TECHNICAL FIELD

The present disclosure relates to a vehicle and a method of attaching a sunroof assembly to the vehicle.

BACKGROUND

Some vehicles are designed with a sunroof cooperating with a passenger compartment. Generally, the sunroof includes a glass component that is movable to selectively uncover an opening in the roof of the vehicle. To attach the sunroof to the vehicle, whether in a top load operation or a bottom load operation, the entire sunroof, including a frame and the glass component, are installed in the vehicle as a single unit. Furthermore, the frame of the sunroof defines a drain channel therearound and a plurality of nozzles extend from the frame and are in fluid communication with the drain channel. A hose is attached to each of the nozzles to drain water away from the sunroof. Each of these hoses are fed through pillars of the vehicle to drain the water.

SUMMARY

The present disclosure provides a method of attaching a sunroof assembly to a vehicle. A structural frame is provided having a roof portion. The structural frame defines a passenger compartment adjacent to the roof portion. The structural frame includes a flange extending along at least a segment of the roof portion. The flange includes a first side facing inwardly toward the passenger compartment and a second side facing outwardly away from the passenger compartment. A sunroof frame is attached to the first side of the flange from inside the passenger compartment. Furthermore, a glass apparatus is operatively connected to the sunroof frame from the second side of the flange outside of the passenger compartment. Attaching the sunroof frame to the first side of the flange occurs before operatively connecting the glass apparatus to the sunroof frame. The sunroof frame and the glass apparatus define the sunroof assembly.

The present disclosure also provides a vehicle including a structural frame having a roof portion. The structural frame defines a passenger compartment adjacent to the roof portion. The structural frame includes a flange extending along at least a segment of the roof portion. The flange includes a first side facing inwardly toward the passenger compartment and a second side facing outwardly away from the passenger compartment. The vehicle also includes a sunroof frame attached to the first side of the flange from inside the passenger compartment. Furthermore, the vehicle includes a glass apparatus operatively connected to the sunroof frame from the second side of the flange outside of the passenger compartment. The sunroof frame and the glass apparatus define a sunroof assembly.

Assembling the sunroof frame to the structural frame separately from the glass apparatus allows for more freedom of design. For example, the glass apparatus can be different configurations from the size of the aperture in the roof panel. The glass apparatus can be larger than the aperture in the roof panel and thus overlap a portion of the roof panel to give the glass apparatus a larger exterior appearance. Furthermore, having the sunroof frame and the glass apparatus assembled separately allows at least some parts of the sunroof assembly to be reused.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 3 is a schematic perspective view of the structural frame with a roof panel of a first configuration attached thereto, and a sunroof assembly exploded from the structural frame in a configuration cooperating with the roof panel of the first configuration and a headliner exploded from the structural frame in a configuration cooperating with the roof panel of the first configuration.

FIG. 4 is a schematic perspective view of the structural frame with a roof panel of a second configuration attached thereto, and a sunroof assembly exploded from the structural frame in a configuration cooperating with the roof panel of the second configuration and two different headliners exploded from the structural frame in two configurations that each cooperate with the roof panel of the second configuration.

FIG. 5 is a schematic fragmentary top view of the structural frame.

FIG. 6 is a schematic fragmentary cross-sectional view of the structural frame and the sunroof assembly taken across the vehicle from a driver's side to a passenger's side.

FIG. 7 is a schematic top view of a sunroof frame, with a mechanism illustrated in phantom lines.

FIG. 9 is a schematic side view of the sunroof frame taken from lines 9-9 of FIG. 7, with the mechanism illustrated in phantom lines.

DETAILED DESCRIPTION

Those having ordinary skill in the art will recognize that terms such as "above", "below", "upward", "up", "downward", "down", "top", "bottom", "left", "right", "back", "forth", etc., are used descriptively for the figures, and do not represent limitations on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges that can be subject to human error during installation.

Figure 1:
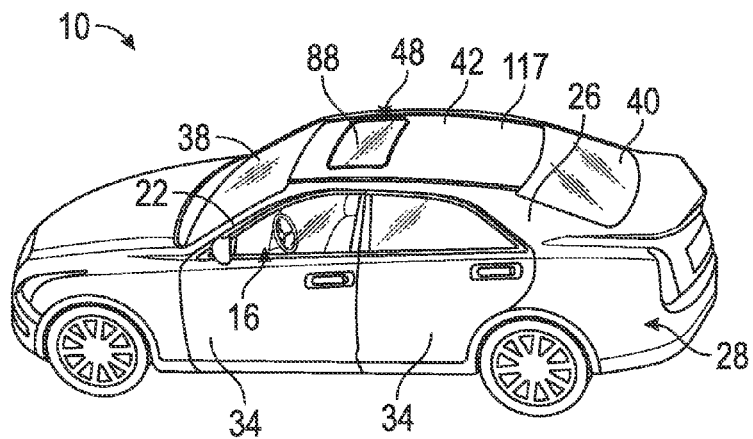
FIG. 1 is a schematic perspective view of a vehicle including a sunroof assembly, with a glass apparatus in a closed position.

Referring to the Figures, wherein like numerals indicate like or corresponding parts throughout the several views, a vehicle 10 is generally shown in FIG. 1. The vehicle 10 can be an automotive vehicle, such as, a car, a truck, a sport utility vehicle (SUV), etc. It is to be appreciated that the vehicle 10 can alternatively be a non-automotive vehicle.

Figure 2:
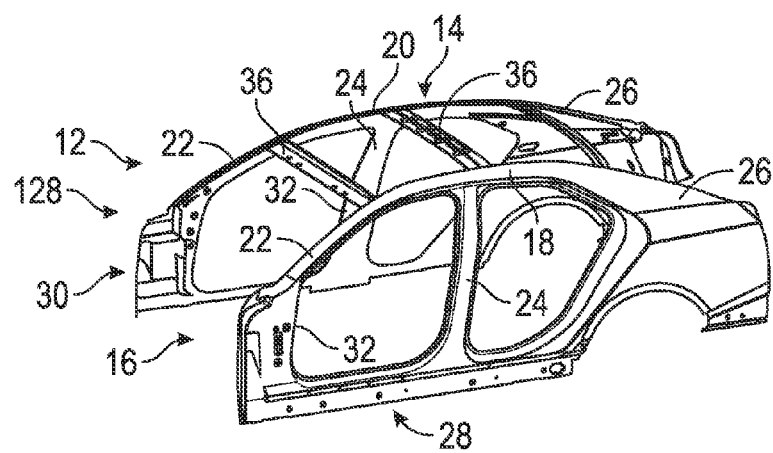
FIG. 2 is a schematic perspective view of a structural frame of the vehicle.

As best shown in FIGS. 2-4, the vehicle 10 includes a structural frame 12 having a roof portion 14. The structural frame 12 defines a passenger compartment 16 adjacent to the roof portion 14. For example, the passenger compartment 16 can have one or more seats therein, etc.

Continuing with FIGS. 2-4, the roof portion 14 can include a first roof rail 18 and a second roof rail 20 spaced from each other. The structural frame 12 can also include A-pillars 22, B-pillars 24, C-pillars 26, etc. Specifically, each side (no number) of the structural frame 12 can include one roof rail 18, 20, one A-pillar 22, one B-pillar 24 and one C-pillar 26. Therefore, one roof rail 18, one A-pillar 22, one B-pillar 24, one C-pillar 26 are disposed along a driver's side 28 of the vehicle 10 and one roof rail 20, one A-pillar 22, one B-pillar 24 and one C-pillar 26 are disposed along a passenger's side 30 of the vehicle 10.

Generally, the passenger compartment 16 is disposed between the driver's side 28 and the passenger's side 30 of the structural frame 12. Furthermore, the structural frame 12 can define one or more cutouts 32 for one or more doors 34 to be movably coupled to structural frame 12 adjacent to respective cutouts 32. Therefore, one or more doors 34 can be coupled to the structural frame 12 along the driver's side 28 and one or more doors 34 can be attached to the structural frame 12 along the passenger's side 30.

The structural frame 12 can include one or more braces 36 attached to each side of the structural frame 12 to support the sides of the structural frame 12. For example, the braces 36 can be attached to each of the roof rails 18, 20. Also referring to FIG. 5, the vehicle 10 can include a windshield 38 generally disposed between the A-pillars 22 and a rear window 40 generally disposed between the C-pillars 26.

Referring to FIGS. 3-5, additionally, the structural frame 12 can include a roof panel 42 attached to the roof portion 14. Specifically, the roof panel 42 is attached the first and second roof rails 18, 20 on each side of the vehicle 10. The roof panel 42 further encloses the passenger compartment 16 along the roof portion 14.

Generally, the roof panel 42 defines an aperture 44. The aperture 44 is exaggerated in FIG. 5 for illustrative purposes only. The roof panel 42 can be any suitable configuration and FIGS. 3 and 4 illustrate different suitable configurations of the roof panel 42. The aperture 44 can be referred to as a first aperture 44. Therefore, the roof panel 42 of FIG. 3 illustrates a single aperture 44 (the first aperture 44) and the roof panel 42 of FIG. 4 defines both the first aperture 44 and a second aperture 46.

Continuing with FIGS. 3 and 4, the vehicle 10 can also include a sunroof assembly 48 that cooperates with the roof panel 42. Specifically, the sunroof assembly 48 cooperates with the aperture 44 to allow a passenger inside the vehicle 10 to open and close the aperture 44 as desired. It is to be appreciated that the configuration of the sunroof assembly 48 can change to cooperate with roof panels 42 of different configurations.

Referring to FIGS. 5 and 6, the structural frame 12 also includes a flange 50 extending along at least a segment of the roof portion 14. Generally, the flange 50 is disposed adjacent to the roof portion 14 and can extend adjacently around the aperture 44 (see FIG. 5). As shown in FIG. 5, the flange 50 can encircle the aperture 44. In certain embodiments, the roof panel 42 (of the structural frame 12) can include the flange 50 and the roof panel 42 is attached to the roof portion 14 by the flange 50 to further enclose the passenger compartment 16. As discussed below, the flange 50 supports the sunroof assembly 48. Therefore, generally, the structural frame 12 supports the sunroof assembly 48.

The flange 50 includes a first side 52 facing inwardly toward the passenger compartment 16 and a second side 54 facing outwardly away from the passenger compartment 16. As such, generally, the first and second sides 52, 54 oppose each other. It is to be appreciated that the flange 50 can be formed of a single piece or more than one piece. For example, the flange 50 can be split into two or more segments 56 that can be attached to each other to define the flange 50 (as shown in FIG. 6). The segments 56 can be attached to each other by any suitable methods, such as welding, adhesive, bonding, brazing, etc.

Turning to FIGS. 3 and 4, the vehicle 10 includes a sunroof frame 58 attached to the first side 52 of the flange 50 from inside the passenger compartment 16. In other words, when the sunroof frame 58 is installed into the vehicle 10, the sunroof frame 58 is positioned inside the passenger compartment 16 and then attached to the flange 50 from inside the passenger compartment 16. Therefore, the sunroof frame 58 is installed on the vehicle 10 in a bottom load operation which refers to the sunroof frame 58 being installed from the inside of the passenger compartment 16. The sunroof frame 58 can be any suitable configuration to cooperate with different roof panel 42 configurations (compare FIGS. 3 and 4).

Continuing with FIGS. 3 and 4, the vehicle 10 further includes a glass apparatus 60 operatively connected to the sunroof frame 58 from the second side 54 of the flange 50 outside of the passenger compartment 16. Specifically, the glass apparatus 60 is installed on the vehicle 10 in a top load operation which refers to the glass apparatus 60 being installed from the outside of the passenger compartment 16 or outside of the vehicle 10. Therefore, the sunroof frame 58 is installed in the bottom load operation while the glass apparatus 60 is installed in the top load operation. Hence, the glass apparatus 60 and the sunroof frame 58 are installed on the vehicle 10 separately. As will be discussed further below, the sunroof frame 58 is attached to the structural frame 12 before the glass apparatus 60 is operatively connected to the sunroof frame 58. The sunroof frame 58 and the glass apparatus 60 define the sunroof assembly 48.

The glass apparatus 60 is movable relative to the sunroof frame 58. Therefore, the glass apparatus 60 is operatively connected to the sunroof frame 58 such that the glass apparatus 60 is movable relative to the sunroof frame 58 while also being coupled to the sunroof frame 58. Specifically, the sunroof assembly 48 can include a mechanism 62 (see FIGS. 7 and 9) supported by the sunroof frame 58 and operatively connected to the glass apparatus 60 to move the glass apparatus 60 relative to the sunroof frame 58. Therefore, the mechanism 62 can move the glass apparatus 60 back and forth as well as raise and lower the glass apparatus 60. The sunroof frame 58 can include a first track 64 (see FIGS. 6 and 9) with the glass apparatus 60 movably coupled to the first track 64.

The mechanism 62 can include a motor, one or more switches, one or more cables 63 (see FIG. 7), one or more links, one or more bars, one or more guides for the cables 63, etc. to move the glass apparatus 60 relative to the sunroof frame 58. The glass apparatus 60 can be movable automatically or manually. In certain embodiments, a switch or button is depressed to actuate the mechanism 62 which moves the glass apparatus 60.

The first track 64 can define a first portion 66 (see FIG. 6) along a first rail 68 (see FIG. 7) of the sunroof frame 58 and a second portion 70 (see FIGS. 6 and 7) along a second rail 72 (see FIG. 7) of the sunroof frame 58. The first and second portions 66, 70 align with each other in a spaced relationship to allow the glass apparatus 60 to move along the first track 64.

Figure 8:
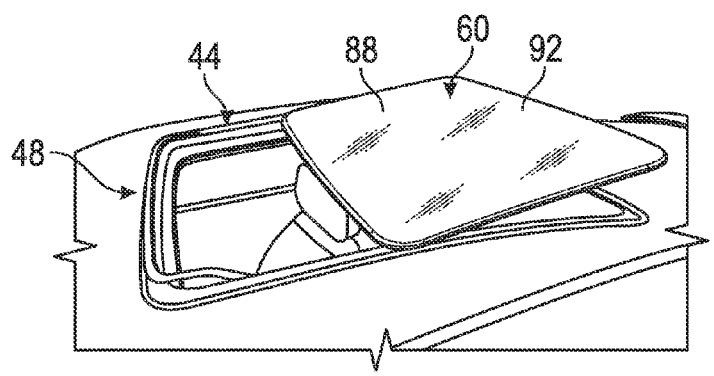
FIG. 8 is a schematic fragmentary perspective view of the vehicle, with the glass apparatus in an open position.

The glass apparatus 60 is in a closed position (see FIG. 1) when covering the aperture 44 and the glass apparatus 60 is in an open position (see FIG. 8) when at least partially spaced from the aperture 44. The glass apparatus 60 can move relative to the sunroof frame 58. Specifically, the glass apparatus 60 can move relative to the first track 64 between the closed and open positions. Actuation of the mechanism 62 causes the glass apparatus 60 to move between the closed and open positions. In certain embodiments, the glass apparatus 60 can move back and forth to open/close the aperture 44. Furthermore, in certain embodiments, the glass apparatus 60 can tilt upwardly/downwardly (raise/lower) to open/close the aperture 44. Therefore, the closed position is when the aperture 44 is completely or entirely covered by the glass apparatus 60, while the open position can include when the glass apparatus 60 is partially or completely spaced from the aperture 44. For example, when the glass apparatus 60 is tilted upwardly away from the aperture 44, the glass apparatus 60 is in the open position. Therefore, the glass apparatus 60 is in the open position when the aperture 44 is partially or completely uncovered by the glass apparatus 60. Furthermore, when the glass apparatus 60 is in the closed position, the glass apparatus 60 covers the aperture 44 such as to seal the aperture 44. Simply stated, the glass apparatus 60 prevents fluid communication between the passenger compartment 16 and the outside of the vehicle 10 when in the closed position.

Referring to FIG. 7, the sunroof frame 58 can also define an opening 74. Generally, the opening 74 at least partially aligns with the aperture 44. The glass apparatus 60 covers the aperture 44 of the roof panel 42 and at least a portion of the opening 74 of the sunroof frame 58 when the glass apparatus 60 is operatively connected to the sunroof frame 58 from outside of the passenger compartment 16. Simply stated, when the glass apparatus 60 is in the closed position, the glass apparatus 60 covers the aperture 44 of the roof panel 42 and at least a portion of the opening 74 of the sunroof frame 58. It is to be appreciated that the sunroof frame 58 can be larger than the aperture 44 as discussed further below.

Referring to FIGS. 3 and 4, the vehicle 10 can also include a headliner 76 coupled to the structural frame 12 from inside the passenger compartment 16. Generally, the headliner 76 covers the roof panel 42 from inside the passenger compartment 16. Therefore, the roof panel 42 can be visible from the outside of the vehicle 10 and is not visible from the inside the passenger compartment 16 because the headliner 76 covers the roof panel 42 inside the passenger compartment 16. The headliner 76 can provide an aesthetical appearance to the passenger compartment 16.

Continuing with FIGS. 3 and 4, the headliner 76 can also define an orifice 78. The orifice 78 aligns with the aperture 44 of the roof panel 42. Furthermore, the opening 74 of the sunroof frame 58 at least partially aligns with the orifice 78. The glass apparatus 60 covers the orifice 78 when in the closed position and the glass apparatus 60 at least partially uncovers the orifice 78 when in the open position. The headliner 76 can be any suitable configuration to cooperate with the different roof panel 42 configurations. Specifically, as shown in FIG. 3, the headliner 76 can define a single orifice 78 or as shown in FIG. 4, the headliner 76 can define a plurality of orifices 78. FIG. 4 shows two different headliners 76 (one with a single orifice 78 and another with a plurality of orifices 78) that can cooperate with that structural frame 12 for illustrative purposes only.

Referring to FIGS. 6 and 7, the sunroof assembly 48 can further include a sunshade 80 movably coupled to the sunroof frame 58. The sunshade 80 selectively blocks light from entering the passenger compartment 16 through the aperture 44 of the roof panel 42. The sunshade 80 can selectively cover the glass apparatus 60 from the inside of the passenger compartment 16.

Continuing with FIG. 6, the sunroof frame 58 can include a second track 82 with the sunshade 80 movably coupled to the second track 82. The second track 82 can define a first portion 84 along the first rail 68 of the sunroof frame 58 and a second portion 86 along the second rail 72 of the sunroof frame 58. A portion of the sunshade 80 is disposed in the second track 82 to guide and/or support the sunshade 80 as the sunshade 80 moves along the second track 82.

The sunshade 80 can be any suitable configuration. For example, the sunshade 80 can be a roll-up type as shown in FIGS. 7 and 9 or any other suitable sunshade type. The first and second tracks 64, 82 can be spaced from each other and each can be disposed in any suitable location.

Turning to FIGS. 3, 4 and 6, the glass apparatus 60 can include a laminated-vitreous element 88 having a first surface 90 facing inwardly toward the passenger compartment 16. The laminated-vitreous element 88 also has a second surface 92 opposing the first surface 90 and facing outwardly away from the passenger compartment 16. The laminated-vitreous element 88 can be, for example, laminated glass, polycarbonate, or any other suitable material. The laminated-vitreous element 88 can present a clear appearance or a shaded/tinted appearance. For example, the laminated-vitreous element 88 can be a translucent color (black tint, brown tint, blue tint, etc.) or be transparent/clear (no tint).

Continuing with FIG. 6, the glass apparatus 60 can include a bracket 94 secured to the first surface 90 of the laminated-vitreous element 88. Therefore, the bracket 94 and the laminated-vitreous element 88 are secured to each other such that the bracket 94 and the laminated-vitreous element 88 are movable as a unit. Generally, the bracket 94 is also operatively connected to the sunroof frame 58. Specifically, the bracket 94 can be movable relative to the sunroof frame 58 when the glass apparatus 60 moves between the open and closed positions. Therefore, the bracket 94 is operatively connected to the sunroof frame 58 such that the bracket 94 is movable relative to the sunroof frame 58 while also being coupled to the sunroof frame 58. Furthermore, the second side 54 of the flange 50 and the second surface 92 of the laminated-vitreous element 88 are spaced from each other.

The bracket 94 can be secured to the laminated-vitreous element 88 by molding, encapsulation or any other suitable method. One suitable method is at least partially encapsulating the bracket 94 to attach the bracket 94 to the laminated-vitreous element 88. Generally, the encapsulation process can utilize a polymeric material such as a polyurethane, etc.

Referring to FIG. 6, the bracket 94 can include a first extension 96 extending away from the first surface 90 toward the passenger compartment 16. Also referring to FIG. 7, the vehicle 10 can include a first link 98 extending toward the first surface 90 away from the passenger compartment 16. The first link 98 can be operatively connected to the sunroof frame 58. Therefore, the sunroof assembly 48 can include the first link 98. The first link 98 and the first extension 96 are secured to each other to operatively connect the glass apparatus 60 to the sunroof frame 58.

The first link 98 is movably coupled to the sunroof frame 58 before operatively connecting the glass apparatus 60 to the sunroof frame 58. The first link 98 is movable relative to the sunroof frame 58. The glass apparatus 60 and the first link 98 move as a unit back and forth between the open and closed positions when the bracket 94 of the glass apparatus 60 is attached to the first link 98. Specifically, the first link 98 is movably disposed in the first track 64 to guide the glass apparatus 60 between the open and closed positions. In other words, the first link 98 can move along the first track 64 back and forth to move the glass apparatus 60 back and forth between the open and closed positions. Therefore, the first link 98 moves in the first track 64 of the first rail 68 of the sunroof frame 58. The first link 98 and/or the first track 64 can be configured to maintain the first link 98 in the first track 64 while allowing the first link 98 to be movable. Therefore, the first link 98 is operatively connected to the sunroof frame 58 such that the first link 98 is movable relative to the sunroof frame 58 while also being coupled to the sunroof frame 58. The mechanism 62 can include the first link 98, with, for example, the cable 63 of the mechanism 62 attached to the first link 98 to move the first link 98 in the first portion 66 of the first track 64.

Referring to FIG. 6, the bracket 94 can include a second extension 100 extending away from the first surface 90 toward the passenger compartment 16. Also referring to FIG. 7, the vehicle 10 can include a second link 102 extending toward the first surface 90 away from the passenger compartment 16. The second link 102 can be operatively connected to the sunroof frame 58. Therefore, the sunroof assembly 48 can include the second link 102. The second link 102 and the second extension 100 are secured to each other to operatively connect the glass apparatus 60 to the sunroof frame 58.

The second link 102 is assembled to the sunroof frame 58 before operatively connecting the glass apparatus 60 to the sunroof frame 58. The second link 102 is movable relative to the sunroof frame 58. The glass apparatus 60 and the second link 102 move as a unit back and forth between the open and closed positions when the bracket 94 of the glass apparatus 60 is attached to the second link 102. Specifically, the second link 102 is movably disposed in the first track 64 to guide the glass apparatus 60 between the open and closed positions. In other words, the second link 102 can move along the first track 64 back and forth to move the glass apparatus 60 back and forth between the open and closed positions. Therefore, the second link 102 moves in the first track 64 of the second rail 72 of the sunroof frame 58. The second link 102 and/or the first track 64 can be configured to maintain the second link 102 in the first track 64 while allowing the second link 102 to be movable. Therefore, the second link 102 is operatively connected to the sunroof frame 58 such that the second link 102 is movable relative to the sunroof frame 58 while also being coupled to the sunroof frame 58. The mechanism 62 can include the second link 102, with, for example, the cable 63 of the mechanism 62 attached to the second link 102 to move the second link 102 in the second portion 70 of the first track 64. The first track 64 can be any suitable configuration to cooperate with the first and second links 98, 102.

Continuing with FIGS. 6 and 7, the sunroof frame 58 can include a platform 104 secured to the first side 52 of the flange 50 to attach the sunroof frame 58 to the structural frame 12. The first link 98 can extend away from the platform 104 and the second link 102 can extend away from the platform 104. Generally, the first link 98 is spaced from the platform 104 and the second link 102 is spaced from the platform 104. Therefore, the first and second links 98, 102 do not engage the platform 104 to minimize frictional engagement therebetween during movement of the first and second links 98, 102. The sunroof frame 58, and more specifically the platform 104, and the flange 50 can be secured to each other by any suitable method, such as fasteners 105, clips, etc. It is to be appreciated that any suitable number of fasteners 105 can be utilized.

The platform 104 can be any suitable configuration and different configurations are shown in FIGS. 3, 4 and 7. As shown in FIGS. 3 and 4, the platform 104 can be split into a plurality of pieces, and each of the pieces can be secured to the first side 52 of the flange 50 to attach the sunroof frame 58 to the structural frame 12. For example, the platform 104 can include a plurality of tabs and each of the tabs are secured to the first side 52 of the flange 50.

Referring to FIG. 6, the roof portion 14 can include the first roof rail 18 as discussed above. The first roof rail 18 has an inner side 106 facing the first link 98. Furthermore, the roof portion 14 can include the second roof rail 20 as also discussed above. The second roof rail 20 has an inner side 108 facing the second link 102. Specifically, the inner side 106 of the first roof rail 18 and the inner side 108 of the second roof rail 20 face each other. In certain embodiments, the flange 50 is attached to the inner side 106 of the first roof rail 18 and the flange 50 is attached to the inner side 108 of the second roof rail 20. The flange 50 can be coupled or attached to the structural frame 12, such as the roof portion 14, in any suitable location. It is to be appreciated that the flange 50 can be coupled or attached to the roof portion 14 by fasteners, welding, brazing, bonding, adhesive, etc.

Continuing with FIGS. 5 and 6, the flange 50 can include a base 110 disposed adjacent to the inner side 106 of the first roof rail 18. Furthermore, the base 110 of the flange 50 can be disposed adjacent to the inner side 108 of the second roof rail 20. Specifically, the base 110 is disposed proximal to the inner side 106 of the first roof rail 18 and proximal to the inner side 108 of the second roof rail 20.

Continuing with FIG. 6, the flange 50 can also include a rim 112 extending toward the first surface 90 and spaced from the inner side 106 of the first roof rail 18. Additionally, the rim 112 can be spaced from the inner side 108 of the second roof rail 20. In certain embodiments, the rim 112 extends from the second side 54 of the flange 50 toward the laminated-vitreous element 88. Generally, the rim 112 is spaced from the inner side 106 of the first roof rail 18 to define a channel 114 therebetween. More specifically, the base 110, the inner side 106 of the first roof rail 18 and the rim 112 cooperate to define the channel 114 therebetween. Furthermore, the rim 112 is spaced from the inner side 108 of the second roof rail 20 to further define the channel 114. Therefore, the base 110, the inner side 106 of the first roof rail 18, the inner side 108 of the second roof rail 20 and the rim 112 cooperate to further define the channel 114 therebetween. The rim 112 can be integral with the flange 50 or alternatively, the rim 112 can be attached or secured to the flange 50.

Simply stated, the channel 114 is defined in the structural frame 12, and thus, the channel 114 is spaced from the sunroof frame 58. The channel 114 guides liquid fluid away from the sunroof frame 58, and thus away from the aperture 44 of the roof panel 42 and away from the opening 74 of the sunroof frame 58. Referring to FIG. 5, the base 110 of the flange 50 extending across the vehicle 10 between the first and second roof rails 18, 20 can be contoured to direct the liquid fluid toward the first and second roof rails 18, 20 as indicated by the arrows 113 in FIG. 5. In other words, the base 110 encircles the aperture 44, and thus, the channel 114 encircles the aperture 44. Therefore, the channel 114 guides the liquid fluid around the aperture 44.

The flange 50 defines one or more outlets 116 (see FIG. 5) to drain the liquid fluid away from the roof portion 14 of the structural frame 12 and ultimately off the vehicle 10. As shown in FIG. 5, the flange 50 is configured with a plurality of outlets 116, with one outlet 116 disposed adjacent to respective A-pillars 22 and one outlet 116 disposed adjacent to respective C-pillars 26. In certain embodiments, the outlets 116 can direct the liquid fluid behind the windshield 38 and/or behind the rear window 40. Alternatively, the outlets 116 can direct the liquid fluid over the top of the windshield 38 and/or over the top of the rear window 40. It is to be appreciated that the liquid fluid can be drained out of the vehicle 10 through the A-pillars 22 and/or the C-pillars 26. It is to further be appreciated that the outlets 116 can be in any suitable location. Having the structural frame 12 define the channel 114 instead of the sunroof frame 58 allows for the sunroof frame 58 to be simplified by eliminating a drain channel, nozzles and hoses as discussed in the background section above, which can reduce costs, mass, etc.

In certain embodiments, optionally, the roof panel 42 can include an outer cover 117 (see FIG. 1) concealing at least a portion of the flange 50, and thus at least a portion of the channel 114, from visibility outside of the vehicle 10. Therefore, it is to be appreciated that the roof panel 42 can include one or more pieces.

Continuing with FIG. 6, the sunroof assembly 48 can also include a seal 118 attached to the rim 112 to engage the glass apparatus 60 when in the closed position to minimize fluid communication between the channel 114 and the sunroof frame 58. Therefore, the rim 112 and the seal 118 create a barrier between the channel 114 and the sunroof frame 58. The seal 118 engages the first surface 90 when the glass apparatus 60 is in the closed position. More specifically, the seal 118 is attached to the rim 112 to engage the first surface 90 (of the laminated-vitreous element 88) when the glass apparatus 60 is in the closed position to minimize fluid communication between the channel 114 and the sunroof frame 58. Simply stated, the rim 112 extends around the aperture 44 of the roof panel 42 and thus the seal 118 extends around the aperture 44 as shown in FIG. 5. Therefore, the rim 112 encircles the aperture 44 and thus the seal 118 encircles the aperture 44.

Referring to FIGS. 3 and 6, the laminated-vitreous element 88 includes a peripheral edge 120 disposed adjacent to the inner side 106 of the first roof rail 18 and the inner side 108 of the second roof rail 20 when the glass apparatus 60 is in the closed position. The laminated-vitreous element 88 can extend across the roof portion 14 of the structural frame 12 from the first roof rail 18 to the second roof rail 20 which gives the vehicle 10 a full glass roof appearance. Therefore, as shown in FIG. 6, the laminated-vitreous element 88 at least partially overlaps the flange 50 when the glass apparatus 60 is in the closed position. Simply stated, the laminated-vitreous element 88 can be larger than the aperture 44 of the roof panel 42 such that a portion of the laminated-vitreous element 88 overlaps a portion of the roof panel 42.

For the roof panel 42 configuration of FIG. 3, the roof panel 42 can include a lip 122 extending from the first roof rail 18 to the second roof rail 20 to allow the second surface 92 of the laminated-vitreous element 88 to be substantially flush with an adjacent portion of the outside of the roof panel 42 when in the closed position. It is to be appreciated that the lip 122 is optional depending on the configuration of the roof panel 42 and the lip 122 can be other lengths or configuration depending on the length/configuration of the laminated-vitreous element 88.

The laminated-vitreous element 88 discussed above can be referred to as a first laminated-vitreous element 88. In certain embodiments, a second laminated-vitreous element 124 is attached to the structural frame 12 as shown in FIG. 4. Therefore, the roof panel 42 can be configured to accommodate the first and second laminated-vitreous element 88, 124. The second laminated-vitreous element 124 can be spaced from or abut the first laminated-vitreous element 88. The second laminated-vitreous element 124 can be attached to the structural frame 12, or more specifically, the roof panel 42 by any suitable methods. One suitable method is bonding the second laminated-vitreous element 124 to the structural frame 12. Any suitable bonding procedure can be utilized to attach the second laminated-vitreous element 124 to the structural frame 12 and one suitable method is adhesive.

The second laminated-vitreous element 124 is affixed to the structural frame 12 such that the second laminated-vitreous element 124 is stationary. As such, the first laminated-vitreous element 88 is movable between the open and closed positions while the second laminated-vitreous element 124 is not movable between the open and closed positions. The second laminated-vitreous element 124 includes a peripheral edge 126 disposed adjacent to the inner side 106 of the first roof rail 18 and the inner side 108 of the second roof rail 20. Similarly to the first laminated-vitreous element 88, the second laminated-vitreous element 124 can extend across the roof portion 14 of the structural frame 12 from the first roof rail 18 to the second roof rail 20 which gives the vehicle 10 a full glass roof appearance.

The second laminated-vitreous element 124 can be, for example, laminated glass, polycarbonate, or any other suitable sunroof material. The second laminated-vitreous element 124 can present a clear appearance, a shaded/tinted appearance or an opaque appearance. For example, the second laminated-vitreous element 124 can be a translucent color (black tint, brown tint, blue tint, etc.), can be transparent/clear (no tint) or can be nontransparent (non-see through). Generally, the second laminated-vitreous element 124 can provide an aesthetical appearance to the outside and/or the inside of the vehicle 10. For example, when utilizing the headliner 76 with a plurality of orifices 78, the first laminated-vitreous element 88 aligns with one of the orifices 78 when in the closed position and the second laminated-vitreous element 124 aligns with another one of the orifices 78, and thus both elements 88, 124 are visible from inside the passenger compartment 16 which provides the inside and the outside of the vehicle 10 with a panoramic view. As another example, when utilizing the headliner 76 with a single orifice 78, the first laminated-vitreous element 88 is visible from inside the passenger compartment 16 when in the closed or partially open position while the second laminated-vitreous element 124 is only visible from the outside of the vehicle 10 which provides the outside of the vehicle 10 with a panoramic look. Generally, when the glass apparatus 60 moves to the open position, the first laminated-vitreous element 88 moves over the top of the roof panel 42 or the second laminated-vitreous element 124.

Figure 10:
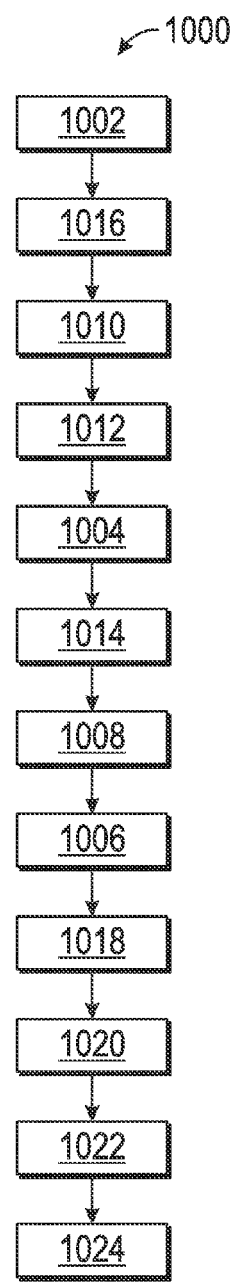
FIG. 10 is a schematic flowchart of a method of attaching the sunroof assembly to the vehicle.

Referring to FIG. 10, the present disclosure also provides a method 1000 of attaching the sunroof assembly 48 to the vehicle 10. The method 1000 includes providing 1002 the structural frame 12 having various features discussed above, such as the roof portion 14, the passenger compartment 16 and the flange 50. The flange 50 can include various features such as the first side 52 and the second side 54 as also discussed above.

The method 1000 includes attaching 1004 the sunroof frame 58 to the first side 52 of the flange 50 from inside the passenger compartment 16 and operatively connecting 1006 the glass apparatus 60 to the sunroof frame 58 from the second side 54 of the flange 50 outside of the passenger compartment 16. The sunroof frame 58 is installed on the vehicle 10 in the bottom load operation which refers to the sunroof frame 58 being installed from the inside of the passenger compartment 16. The sunroof frame 58 can be inserted into the passenger compartment 16 in any suitable direction from inside the passenger compartment 16 to attach the sunroof frame 58 to the first side 52 of the flange 50.

The glass apparatus 60 is installed on the vehicle 10 in the top load operation which refers to the glass apparatus 60 being installed from the outside of the passenger compartment 16 or outside of the vehicle 10. Therefore, the sunroof frame 58 is installed in the bottom load operation while the glass apparatus 60 is installed in the top load operation. Hence, the glass apparatus 60 and the sunroof frame 58 are installed in the vehicle 10 separately.

Having the glass apparatus 60 installed separately from the sunroof frame 58 allows for more freedom of design with regard to both the sunroof assembly 48 and the structural frame 12. For example, the glass apparatus 60 can be different configurations from the size of the aperture 44 in the roof panel 42 which provides more design freedom. The glass apparatus 60 can be larger than the aperture 44 in the roof panel 42 and thus overlap a portion of the roof panel 42 to give the glass apparatus 60 a larger exterior appearance. Furthermore, the structural frame 12 does not have to be modified to accommodate the sunroof assembly 48 as discussed herein, which therefore, can reduce manufacturing costs. Specifically, existing structural frame 12 designs do not have to be modified to accommodate the assembly operations of attaching 1004 the sunroof frame 58 to the first side 52 of the flange 50 from inside the passenger compartment 16 and operatively connecting 1006 the glass apparatus 60 to the sunroof frame 58 from the second side 54 of the flange 50 from outside of the passenger compartment 16 as discussed herein.

In certain embodiments, attaching 1004 the sunroof frame 58 to the first side 52 of the flange 50 occurs before operatively connecting 1006 the glass apparatus 60 to the sunroof frame 58. Therefore, as discussed above, the glass apparatus 60 and the sunroof frame 58 are installed in the vehicle 10 separately. In certain embodiments, operatively connecting 1006 the glass apparatus 60 to the sunroof frame 58 can include operatively connecting the bracket 94 to the sunroof frame 58 such that the second side 54 of the flange 50 and the second surface 92 of the laminated-vitreous element 88 are spaced from each other. Providing space between the second side 54 of the flange 50 and the second surface 92 of the laminated-vitreous element 88 allows room for the rim 112, the seal 118 and thus the channel 114.

More specifically, operatively connecting 1006 the glass apparatus 60 to the sunroof frame 58 can include securing the first link 98 and the first extension 96 together. Furthermore, operatively connecting 1006 the glass apparatus 60 to the sunroof frame 58 can include securing the second link 102 and the second extension 100 together. Generally, securing the first link 98 and the first extension 96 together occurs before or after securing the second link 102 to the second extension 100. The first link 98 and the first extension 96 can be secured to each other by any suitable method, such as fasteners 125, clips, etc. Similarly, the second link 102 and the second extension 100 can be secured to each other by any suitable method, such as fasteners 127, clips, etc. It is to be appreciated that any suitable number of fasteners 125, 127 can be utilized.

Therefore, the glass apparatus 60 is operatively connected to the sunroof frame 58 such that the glass apparatus 60 is movable relative to the sunroof frame 58 while also being coupled to the sunroof frame 58. Specifically, the glass apparatus 60 is operatively connected to the sunroof frame 58 through the respective fasteners 125, 127 that couple together the first link 98 and the first extension 96, as well as the second link 102 and the second extension 100. The fasteners 125, 127 provide an easy or simple way to operatively couple and uncouple the glass apparatus 60 and the sunroof frame 58.

The glass apparatus 60 is movable relative to a portion of the sunroof frame 58, such as movable relative to the first and second rails 68, 72 of the sunroof frame 58. Specifically, the glass apparatus 60 can move along the first track 64 of the sunroof frame 58. More specifically, the first and second links 98, 102 are movably secured in the first and second portions 66, 70 respectively of the first track 64 of the sunroof frame 58. The glass apparatus 60 is attached to the first and second links 98, 102 to move together as the unit, back and forth, between the open and closed positions. Therefore, the glass apparatus 60 is operatively connected to the sunroof frame 58 through the first and second links 98, 102.

The method 1000 can also include positioning 1008 the peripheral edge 120 of the laminated-vitreous element 88 adjacent to the inner side 106 of the first roof rail 18 and the inner side 108 of the second roof rail 20 when operatively connecting 1006 the glass apparatus 60 to the sunroof frame 58 such that the laminated-vitreous element 88 at least partially overlaps the flange 50, the rim 112 and the seal 118 when the glass apparatus 60 is in the closed position. Therefore, positioning 1008 the peripheral edge 120 occurs before or simultaneously with operatively connecting 1006 the glass apparatus 60 to the sunroof frame 58.

The method 1000 can further include attaching 1010 the roof panel 42 to the roof portion 14 by the flange 50 to further enclose the passenger compartment 16. More specifically, attaching 1010 the roof panel 42 to the roof portion 14 by the flange 50 can include attaching the flange 50 to the inner side 106 of the first roof rail 18. Furthermore, attaching 1010 the roof panel 42 to the roof portion 14 by the flange 50 can include attaching the flange 50 to the inner side 108 of the second roof rail 20. In certain embodiments, attaching 1010 the roof panel 42 occurs before attaching 1004 the sunroof frame 58 to the first side 52 of the flange 50. Therefore, attaching 1010 the roof panel 42 occurs before operatively connecting 1006 the glass apparatus 60 to the sunroof frame 58.

Attaching 1010 the roof panel 42 to the roof portion 14 can further include brazing the roof panel 42 to the roof portion 14. The roof panel 42 can be attached to the roof portion 14 by any suitable brazing or welding procedure and one suitable way is laser brazing. In addition, attaching 1010 the roof panel 42 to the roof portion 14 can further include bonding the roof panel 42 to the roof portion 14. Any suitable bonding procedure can be utilized to attach the roof panel 42 to the roof portion 14 of the structural frame 12 and one suitable way is adhesive. It is to be appreciated that the roof panel 42 can be attached to the roof portion 14 by both brazing and bonding or can be attached to the roof portion 14 by one of brazing or bonding.

The method 1000 can further include positioning 1012 the sunroof frame 58 adjacent to the aperture 44 of the roof panel 42 such that at least a portion of the opening 74 aligns with the aperture 44 of the roof panel 42. Generally, positioning 1012 the sunroof frame 58 occurs before or simultaneously with attaching 1004 the sunroof frame 58 to the first side 52 of the flange 50.

The method 1000 can also include covering 1014 the aperture 44 of the roof panel 42 and at least a portion of the opening 74 of the sunroof frame 58 with the glass apparatus 60 when operatively connecting 1006 the glass apparatus 60 to the sunroof frame 58. Therefore, covering 1014 the aperture 44 of the roof panel 42 with the glass apparatus 60 occurs before or simultaneously with operatively connecting 1006 the glass apparatus 60 to the sunroof frame 58.

The method 1000 can also include attaching 1016 the seal 118 to the rim 112 to engage the first surface 90 when the glass apparatus 60 is in the closed position to minimize fluid communication between the channel 114 and the sunroof frame 58. Attaching 1016 the seal 118 can occur before attaching 1004 the sunroof frame 58 to the first side 52 of the flange 50. Alternatively, attaching 1016 the seal 118 can occur after attaching 1004 the sunroof frame 58 to the first side 52 of the flange 50 and before operatively connecting 1006 the glass apparatus 60 to the sunroof frame 58.

Having the glass apparatus 60 assembled separately from the sunroof frame 58 allows at least parts of the sunroof assembly 48 to be reused. Therefore, the method 1000 can further include detaching 1018 the glass apparatus 60 from the sunroof frame 58 and detaching 1020 the sunroof frame 58 from the first side 52 of the flange 50 after detaching 1018 the glass apparatus 60 to remove the sunroof frame 58 from the structural frame 12.

Once the sunroof assembly 48 is detached from the vehicle 10, the glass apparatus 60 and/or the sunroof frame 58 can be reused with a second structural frame 128 (see FIG. 4). The second structural frame 128 can have the same features and configurations as discussed above for the first structural frame 12 and thus will not be discussed further. Therefore, the second structural frame 128 can be embodied as shown, for example, in FIGS. 1-3.

In certain embodiments, the method 1000 can also include providing 1022 the second structural frame 128 and reusing 1024 the detached sunroof frame 58 with the second structural frame 128. The second structural frame 128 can be for the same type of vehicle 10 or a different type of vehicle 10 in which the sunroof frame 58 is compatible. Being able to reuse the sunroof frame 58 can reduce the number of new sunroof frames 58 being manufactured which can reduce costs.

It is to be appreciated that the order or sequence of performing the method 1000 as identified in the flowchart of FIG. 10 is for illustrative purposes and other orders or sequences are within the scope of the present teachings. It is to also be appreciated that the method 1000 can include other features not specifically identified in the flowchart of FIG. 10.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of attaching a sunroof assembly to a vehicle; the method comprising:
    providing a structural frame having a roof portion and defining a passenger compartment adjacent to the roof portion, and the structural frame including a flange extending along at least a segment of the roof portion, with the flange including a first side facing inwardly toward the passenger compartment and a second side facing outwardly away from the passenger compartment;
    inserting a sunroof frame into the passenger compartment separately from a glass apparatus;
    attaching the sunroof frame to the first side of the flange from inside the passenger compartment independently of the glass apparatus; and
    positioning the glass apparatus outside of the passenger compartment independently of the sunroof frame;
    operatively connecting the glass apparatus to the sunroof frame from the second side of the flange outside of the passenger compartment, and wherein attaching the sunroof frame to the first side of the flange occurs before operatively connecting the glass apparatus to the sunroof frame, with the sunroof frame and the glass apparatus defining the sunroof assembly.

2. A method as set forth in claim 1 wherein the structural frame includes a roof panel and the roof panel includes the flange, and further comprising attaching the roof panel to the roof portion to further enclose the passenger compartment, and wherein attaching the roof panel occurs before attaching the sunroof frame to the first side of the flange.

3. A method as set forth in claim 2 wherein the roof panel defines an aperture and the sunroof frame defining an opening, and further comprising positioning the sunroof frame adjacent to the aperture of the roof panel such that at least a portion of the opening aligns with the aperture of the roof panel.

4. A method as set forth in claim 3 further comprising covering the aperture of the roof panel and at least a portion of the opening of the sunroof frame with the glass apparatus when operatively connecting the glass apparatus to the sunroof frame, and with the glass apparatus being in a closed position when covering the aperture and being in an open position when at least partially spaced from the aperture.

5. A method as set forth in claim 1 wherein:
    the glass apparatus includes a laminated-vitreous element having a first surface facing inwardly toward the passenger compartment and a second surface opposing the first surface and facing outwardly away from the passenger compartment;
    the glass apparatus includes a bracket secured to the first surface of the laminated-vitreous element; and
    operatively connecting the glass apparatus to the sunroof frame includes operatively connecting the bracket to the sunroof frame.

6. A method as set forth in claim 5 further including a first link extending toward the first surface away from the passenger compartment and operatively connected to the sunroof frame, and wherein the bracket includes a first extension extending away from the first surface toward the passenger compartment, and wherein operatively connecting the glass apparatus to the sunroof frame includes securing the first link and the first extension together.

7. A method as set forth in claim 6 wherein:
    the roof portion includes a first roof rail having an inner side facing the first link, and further comprising attaching the flange to the inner side of the first roof rail; and
    the flange includes a rim extending toward the first surface and spaced from the inner side of the first roof rail to define a channel therebetween, and further comprising attaching a seal to the rim to engage the first surface when the glass apparatus is in a closed position to minimize fluid communication between the channel and the sunroof frame.

8. A method as set forth in claim 7:
further including a second link extending toward the first surface away from the passenger compartment and operatively connected to the sunroof frame;
wherein the bracket includes a second extension extending away from the first surface toward the passenger compartment, and wherein operatively connecting the glass apparatus to the sunroof frame includes securing the second link and the second extension together;
wherein the roof portion includes a second roof rail spaced from the first roof rail and having an inner side facing the second link, and further comprising attaching the flange to the inner side of the second roof rail; and
wherein the laminated-vitreous element includes a peripheral edge, and further comprising positioning the peripheral edge of the laminated-vitreous element adjacent to the inner side of the first and second roof rails when operatively connecting the glass apparatus to the sunroof frame such that the laminated-vitreous element at least partially overlaps the flange, the rim and the seal when the glass apparatus is in the closed position.

9. A method as set forth in claim 1 further comprising detaching the glass apparatus from the sunroof frame and detaching the sunroof frame from the first side of the flange after detaching the glass apparatus to remove the sunroof frame from the structural frame.

10. A method as set forth in claim 9 further comprising providing a second structural frame and reusing the detached sunroof frame with the second structural frame.

11. A vehicle comprising:
a structural frame having a roof portion and defining a passenger compartment adjacent to the roof portion, and the structural frame including a flange extending along at least a segment of the roof portion, with the flange including a first side facing inwardly toward the passenger compartment and a second side facing outwardly away from the passenger compartment;
a sunroof frame and a glass apparatus defining a sunroof assembly;
wherein the sunroof frame is inserted inside the passenger compartment separately from the glass apparatus, and the sunroof frame is attached to the first side of the flange from inside the passenger compartment independently of the glass apparatus; and
wherein the glass apparatus is positioned outside of the passenger compartment independently of the sunroof frame, and the glass apparatus is operatively connected to the sunroof frame from the second side of the flange outside of the passenger compartment.

12. A vehicle as set forth in claim 11 wherein the structural frame includes a roof panel and the roof panel includes the flange, and the roof panel defines an aperture, and with the glass apparatus being in a closed position when covering the aperture and being in an open position when at least partially spaced from the aperture, and wherein the glass apparatus includes a laminated-vitreous element having a first surface facing inwardly toward the passenger compartment and a second surface opposing the first surface and facing outwardly away from the passenger compartment, and wherein the laminated-vitreous element overlaps the second side of the flange when in the closed position.

13. A vehicle as set forth in claim 12 wherein the sunroof frame defines an opening, with the opening at least partially aligning with the aperture, with the laminated-vitreous element covering the aperture of the roof panel when in the closed position and the laminated-vitreous element extends beyond the opening of the sunroof frame when in the closed position.

14. A vehicle as set forth in claim 11 wherein the glass apparatus includes a laminated-vitreous element having a first surface facing inwardly toward the passenger compartment and a second surface opposing the first surface and facing outwardly away from the passenger compartment, and wherein the glass apparatus includes a bracket disposed directly under the laminated-vitreous element such that the bracket is secured to the first surface of the laminated-vitreous element, and wherein the sunroof frame defines an opening and includes a first track facing the opening of the sunroof frame, and the bracket is operatively connected to the first track of the sunroof frame, with the second side of the flange and the second surface of the laminated-vitreous element being spaced from each other.

15. A vehicle as set forth in claim 14 further including a first link extending toward the first surface away from the passenger compartment and movably disposed in the first track of the sunroof frame, and wherein the bracket includes a first extension extending away from the first surface toward the passenger compartment, with the first link and the first extension secured to each other to operatively connect the glass apparatus to the sunroof frame.

16. A vehicle as set forth in claim 15 wherein:
the roof portion includes a first roof rail having an inner side facing the first link, with the flange attached to the inner side of the first roof rail, and the flange includes a base disposed adjacent to the inner side of the first roof rail; and
the flange includes a rim extending toward the first surface and spaced from the inner side of the first roof rail, with the base, the inner side of the first roof rail and the rim cooperating to define a channel therebetween, and with the channel spaced from the sunroof frame, and the laminated-vitreous element overlapping the channel when in the closed position.

17. A vehicle as set forth in claim 16 further including a seal attached to the rim to engage the glass apparatus when in a closed position to minimize fluid communication between the channel and the sunroof frame, and wherein the seal engages the first surface when the glass apparatus is in the closed position.

18. A vehicle as set forth in claim 16:
further including a second link extending toward the first surface away from the passenger compartment and movably disposed in the first track of the sunroof frame;
wherein the bracket includes a second extension extending away from the first surface toward the passenger compartment, with the second link and the second extension secured to each other to operatively connect the glass apparatus to the sunroof frame;
wherein the roof portion includes a second roof rail spaced from the first roof rail and having an inner side facing the second link, with the flange attached to the inner side of the second roof rail, with the base of the flange disposed adjacent to the inner side of the second roof rail, and with the base, the inner side of the first and second roof rails and the rim cooperating to further define the channel therebetween; and
wherein the laminated-vitreous element includes a peripheral edge disposed adjacent to the inner side of the first and second roof rails when the glass apparatus is in a closed position, with the laminated-vitreous element at least partially disposed over the second side of the flange such that the laminated-vitreous element overlaps the flange when the glass apparatus is in the closed position.

19. A vehicle as set forth in claim 11 wherein the sunroof frame includes a platform secured to the first side of the flange to attach the sunroof frame to the structural frame.

20. A vehicle as set forth in claim 19 further including a first link extending away from the platform and operatively connected to the sunroof frame, and wherein the bracket includes a first extension, with the first link spaced from the platform, and wherein the first link and the first extension are secured to each other to operatively connect the glass apparatus to the sunroof frame.

* * * * *